United States Patent
Uehara

(10) Patent No.: US 9,665,449 B2
(45) Date of Patent: May 30, 2017

(54) APPARATUS AND METHOD FOR SETTING INFORMATION TO A REPLACEABLE DEVICE INSTALLED IN A DEVICE

(71) Applicant: FUJITSU LIMITED, Kawasaki-shi, Kanagawa (JP)

(72) Inventor: Mikio Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 14/743,110

(22) Filed: Jun. 18, 2015

(65) Prior Publication Data

US 2016/0011808 A1    Jan. 14, 2016

(30) Foreign Application Priority Data

Jul. 14, 2014    (JP) ................... 2014-144575

(51) Int. Cl.
| | |
|---|---|
| G06F 12/00 | (2006.01) |
| G06F 11/20 | (2006.01) |
| G06F 11/00 | (2006.01) |
| G06F 11/14 | (2006.01) |
| G06F 13/00 | (2006.01) |
| G06F 13/28 | (2006.01) |

(52) U.S. Cl.
CPC ............ *G06F 11/20* (2013.01); *G06F 11/006* (2013.01); *G06F 11/1441* (2013.01)

(58) Field of Classification Search
CPC ..... G06F 11/20; G06F 11/006; G06F 11/1441
See application file for complete search history.

(56) References Cited

U.S. PATENT DOCUMENTS

| | | | | | |
|---|---|---|---|---|---|
| 5,590,376 | A | * | 12/1996 | Kou ..................... | G06F 3/0601 |
| | | | | | 710/15 |
| 6,058,455 | A | * | 5/2000 | Islam .................. | G06F 11/1096 |
| | | | | | 710/10 |
| 6,098,119 | A | * | 8/2000 | Surugucchi ........... | G06F 3/0626 |
| | | | | | 710/10 |
| 2004/0133742 | A1 | * | 7/2004 | Vasudevan .......... | G06F 11/1096 |
| | | | | | 711/114 |

FOREIGN PATENT DOCUMENTS

| | | |
|---|---|---|
| JP | 2003-15973 | 1/2003 |
| JP | 2008-141468 | 6/2008 |

* cited by examiner

*Primary Examiner* — Mark Giardino, Jr.
(74) *Attorney, Agent, or Firm* — Staas & Halsey LLP

(57) ABSTRACT

An apparatus is installed in a main-unit device and used for transmission, where the main-unit device stores first setting information for setting the main-unit device and the apparatus, and the apparatus stores second setting information for setting the main-unit device and the apparatus, and determines whether one of the main-unit device and the apparatus has been replaced, based on the second setting information stored in the apparatus. When the apparatus has been replaced with a new apparatus having the same configuration, the apparatus copies the first setting information stored in the main-unit device into the new apparatus as the second setting information for the new apparatus. When the main-unit device has been replaced with a new main-unit device having the same configuration, the apparatus copies the second setting information stored in the apparatus into the new main-unit device as the first setting information.

5 Claims, 18 Drawing Sheets

FIG. 4

| SETTING ITEM | EXAMPLE OF SET VALUE |
|---|---|
| IP ADDRESS | 192.168.1.100 |
| SUBNET MASK | 255.255.255.0 |
| GATEWAY | 192.168.1.1 |
| SMTP SERVER NAME | Mail.example.com |
| OUTGOING E-MAIL ADDRESS | From_address@example.com |
| INCOMING E-MAIL ADDRESS | To_address@example.com |

FIG. 5

| SETTING ITEM | EXAMPLE OF SET VALUE |
|---|---|
| OUTLET GROUP #1 SHUTDOWN TIME | 180 s |
| OUTLET GROUP #2 SHUTDOWN TIME | 120 s |
| SWITCHING SENSITIVITY | HIGH |
| LOW BATTERY SIGNAL TIME | 7 min |
| OUTLET GROUP #1 POWER-ON DELAY TIME | 10 s |
| OUTLET GROUP #2 POWER-ON DELAY TIME | 20 s |

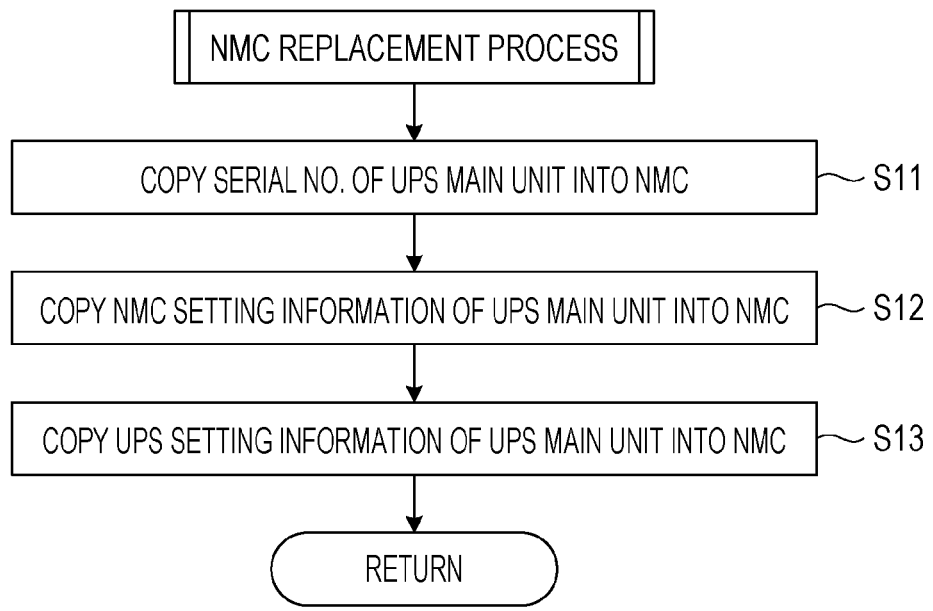
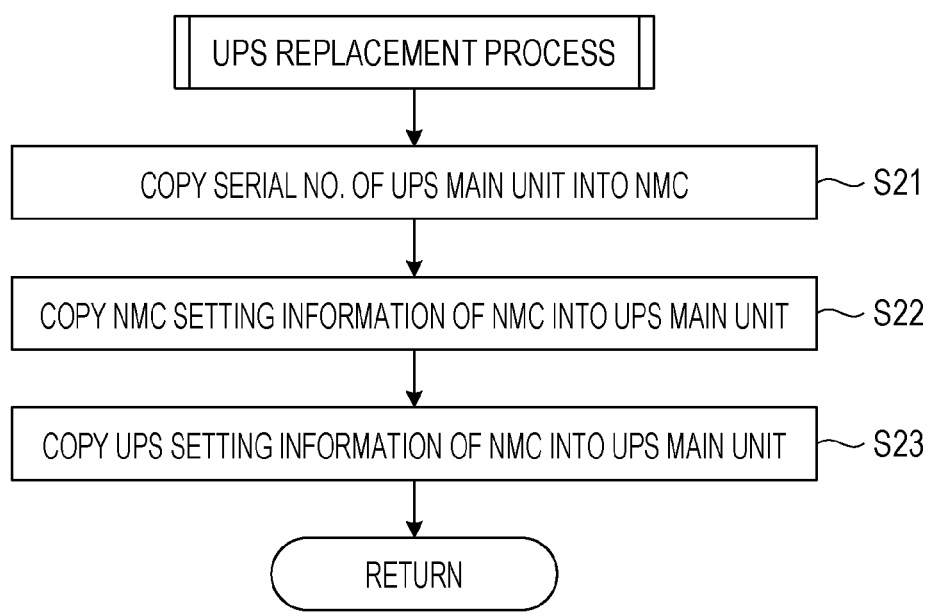

FIG. 18

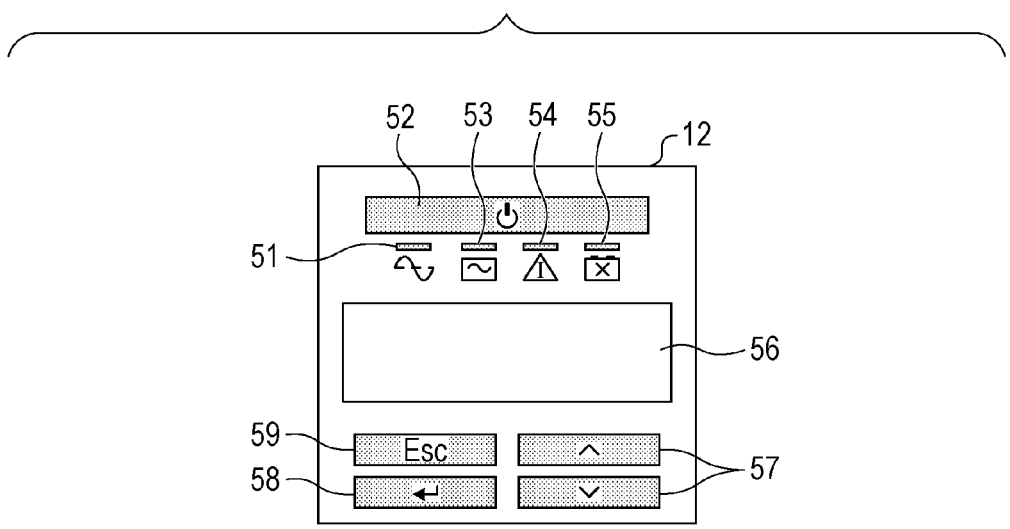

| PROCEDURE FOR RESTORING NMC SETTING INFORMATION<br>(AT TIME OF NMC REPLACEMENT)<br>1) POWER ON UPS DEVICE AND NMC<br>2) CONFIRM DISPLAY OF "DO YOU WANT TO SET IP ADDRESS?"<br>   ON DISPLAY SCREEN<br>3) PRESS ENTER BUTTON |
|---|
| PROCEDURE FOR RESTORING UPS SETTING INFORMATION<br>(AT TIME OF UPS MAIN UNIT REPLACEMENT)<br>1) POWER ON UPS DEVICE AND NMC<br>2) CONFIRM DISPLAY OF "DO YOU WANT TO MAKE SETTINGS FOR UPS?"<br>   ON DISPLAY SCREEN<br>3) PRESS ENTER BUTTON |

APPARATUS AND METHOD FOR SETTING INFORMATION TO A REPLACEABLE DEVICE INSTALLED IN A DEVICE

CROSS-REFERENCE TO RELATED APPLICATION

This application is based upon and claims the benefit of priority of the prior Japanese Patent Application No. 2014-144575, filed on Jul. 14, 2014, the entire contents of which are incorporated herein by reference.

FIELD

The embodiments discussed herein are related to apparatus and method for setting information to a replaceable device installed in a device.

BACKGROUND

When a device is replaced for maintenance, settings similar to those for the device before replacement have to be made for a device after the replacement. In devices with software for setting, such as servers, settings may be made by using the software. However, for example, for devices without software for setting, such as uninterruptible power supply (UPS) devices that supply power in the event of a power outage, settings have to be made by using a setting tool such as a personal computer.

FIG. 21 is a diagram illustrating an example of an operation for setting a UPS device. As illustrated in FIG. 21, for settings of a UPS device 9, first, a setting tool and a network management card (NMC) 95 are coupled via a serial cable, and settings of the NMC 95 are made from the outside (1). The NMC 95 is a device for the UPS device 9 to communicate via a local area network (LAN) with another device. NMC setting information 96 is the set information. The NMC setting information 96 includes an Internet protocol (IP) address.

Once the settings of the NMC 95 are made, the UPS device 9 is enabled to communicate via a LAN with a server that supplies power, and UPS setting information 97 is set by using a UPS management program that runs on a server (2). Here, the UPS setting information 97 is setting information of the UPS main unit except for the NMC 95.

Note that, as a setting method at the time of device replacement, there is a related art technique. In this technique, upon replacement of a transmission device, a transmission device after replacement acquires an IP address from another device through non-IP communication, then acquires setting information of the transmission device itself from another transmission device through IP communication, and makes settings.

Japanese Laid-open Patent Publication No. 2008-141468 is an example of the related art technique.

SUMMARY

According to an aspect of the invention, an apparatus is installed in a main unit device and used for transmission, where the main unit device includes a first memory storing first setting information for setting the main unit device and the apparatus, and the apparatus includes a second memory storing second setting information for setting the main unit device and the apparatus. The apparatus determines whether one of the main unit device and the apparatus has been replaced, based on the second setting information stored in the second memory of the apparatus. When it is determined that the apparatus has been replaced with a new apparatus whose configuration is identical with that of the apparatus, the apparatus copies the first setting information stored in the main unit device into the second memory of the new apparatus as the second setting information for the new apparatus. When it is determined that the main unit device has been replaced with a new main unit device whose configuration is identical with that of the main unit device, the apparatus copies the second setting information stored in the second memory of the apparatus into the first memory of the new main unit device as the first setting information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of NMC setting information, according to an embodiment;

FIG. 5 is a diagram illustrating an example of UPS setting information, according to an embodiment;

FIG. 9 is a diagram illustrating an example of an operational flowchart for an NMC replacement process, according to an embodiment;

FIG. 10 is a diagram illustrating an example of an operational flowchart for a UPS replacement process, according to an embodiment;

FIG. 18 is a diagram illustrating an example of an operation of a control panel, according to an embodiment;

DESCRIPTION OF EMBODIMENTS

Figure 21:
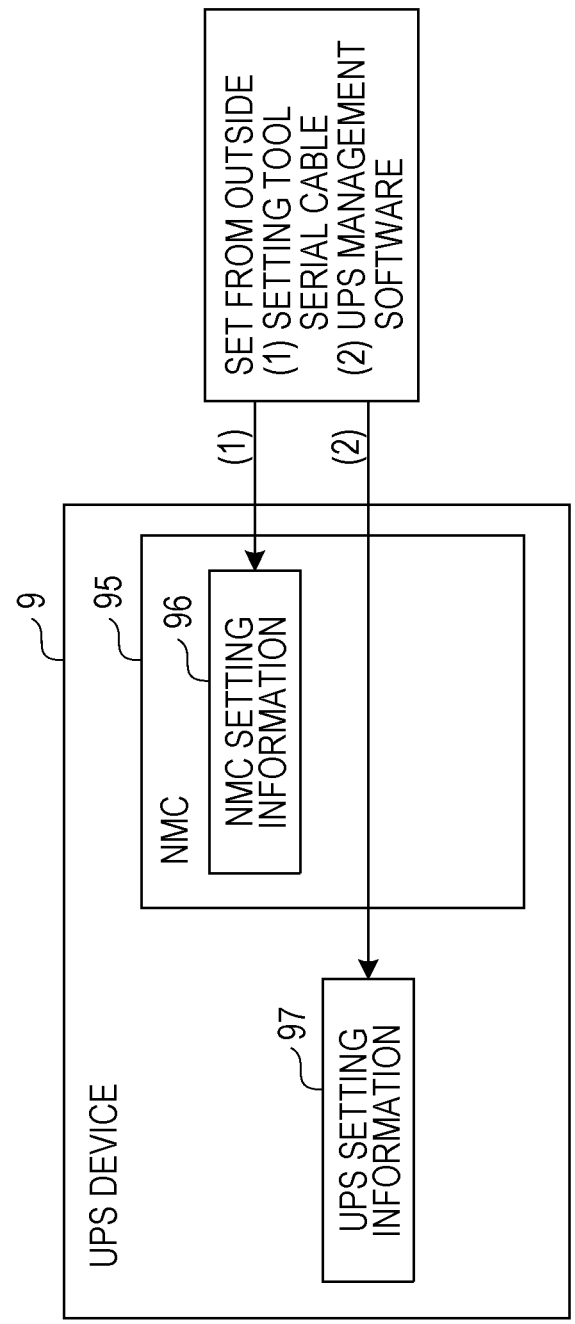
FIG. 21 is a diagram illustrating an example of settings of a UPS device.

As illustrated in FIG. 21, a particular setting tool and a serial cable have to be used for making settings of a UPS device. However, there are problems in that the particular setting tool and the serial cable are sometimes not able to be prepared during maintenance and replacement, and that, even if they are able to be prepared, it takes a long period of time to complete the preparation.

Hereinafter, embodiments of a transmission device and a setting method disclosed in the present application will be described in detail in conjunction with the accompanying drawings. It is to be noted the embodiments are not intended to limit the techniques of the present disclosure.

First Embodiment

Figure 1:
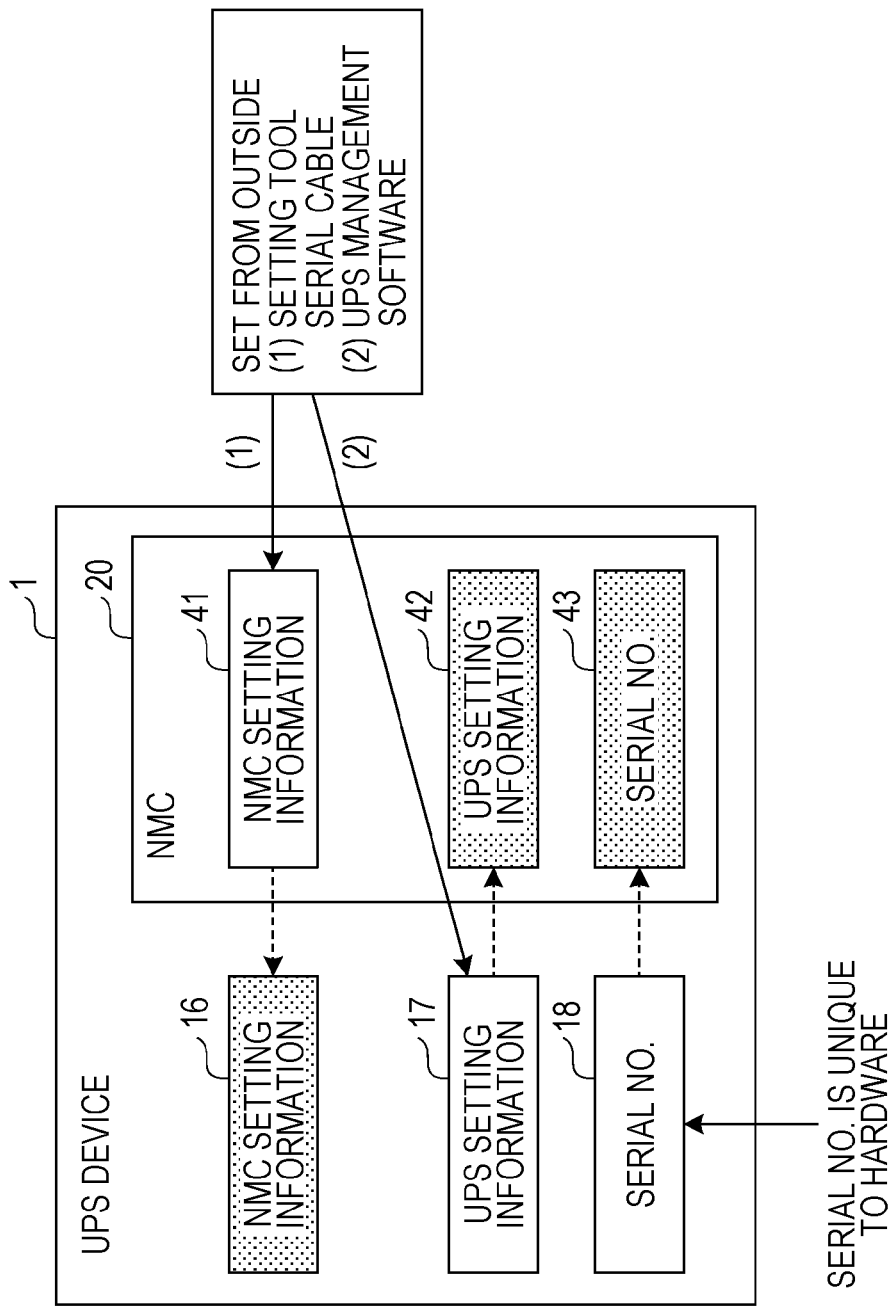
FIG. 1 is a diagram illustrating an example of copying of setting information performed by a UPS device, according to an embodiment.

First, copying of setting information performed by a UPS device according to a first embodiment will be described. FIG. 1 is a diagram for explaining copying of setting information performed by a UPS device according to the first embodiment. As illustrated in FIG. 1, the UPS device 1 copies NMC setting information 41, which is setting information of an NMC 20, into a UPS main unit and stores the copy as NMC setting information 16.

The UPS device 1 also copies UPS setting information 17, which is setting information of the UPS main unit, and a serial number (hereinafter abbreviated as "No.") 18 and stores their copies as UPS setting information 42 and a serial No. 43, respectively, in the NMC 20. Here, the serial No. 18 is a number unique to the device.

Once the NMC 20 is replaced, the UPS device 1 restores the NMC setting information 41 by using the NMC setting information 16. Once the UPS main unit is replaced, the UPS device 1 restores the UPS setting information 17 by using the UPS setting information 42.

In such a way, once the NMC 20 is replaced, the UPS device 1 restores the NMC setting information 41 by using the NMC setting information 16. This facilitates setting at the time of replacement of the NMC 20 and thus may reduce working hours required for the replacement. Once the UPS main unit is replaced, the UPS device 1 restores the UPS setting information 17 using the UPS setting information 42 and the serial No. 43. This facilitates setting at the time of replacement of the UPS main unit. Accordingly, the UPS device 1 may reduce working hours required for replacement of the UPS device 1.

Figure 2:
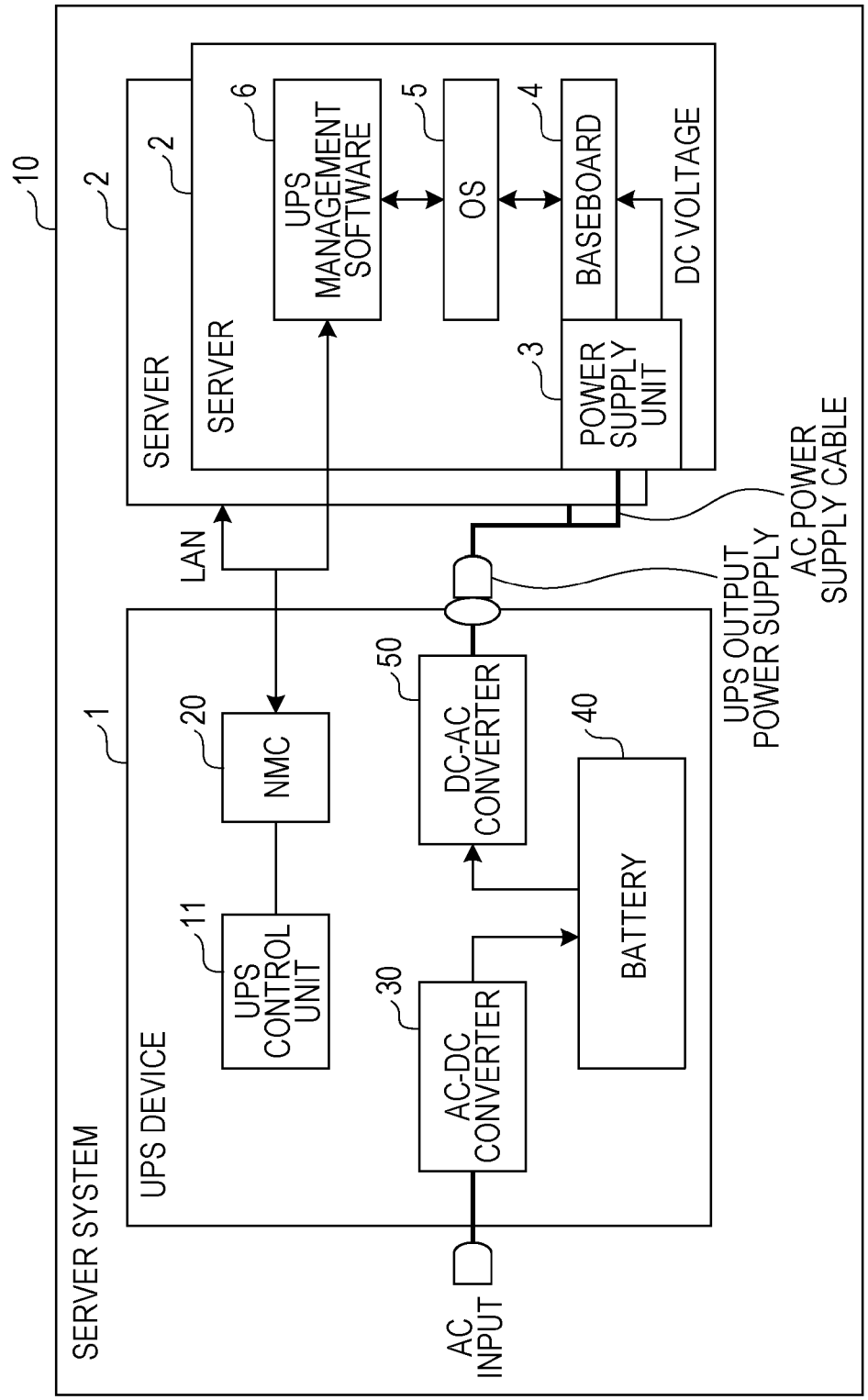
FIG. 2 is a diagram illustrating an example of a configuration of a server system, according to an embodiment.

Next, the configuration of a server system according to the first embodiment will be described. FIG. 2 is a diagram illustrating a configuration of a server system according to the first embodiment. As illustrated in FIG. 2, a server system 10 includes the UPS device 1 and two servers 2. Note that, for the sake of explanatory convenience, only two servers 2 are illustrated here; however, the server system 10 may include three or more servers 2.

The UPS device 1 is coupled to two servers 2 via an alternating current (AC) power supply cable and supplies power to the two servers 2. The UPS device 1 supplies power to the servers 2 only for several minutes in the event of a power failure. The UPS device 1 is coupled to the two servers 2 via a LAN so as to be able to communicate with each server 2.

The UPS device 1 includes a UPS control unit 11, an NMC 20, an AC-DC converter 30, a battery 40, and a DC-AC converter 50. The UPS control unit 11 controls the UPS device 1. The NMC 20 communicates with the servers 2 by using the LAN. The NMC 20 notifies the servers 2 of the occurrence of a power failure, for example, by using the LAN.

The AC-DC converter 30 converts alternating current (AC) power to direct current (DC) power. The battery 40 stores DC power output by the AC-DC converter 30 at any time other than during a power failure and discharges the stored DC power during a power failure. The DC-AC converter 50 converts the DC power output by the battery 40 to AC power and supplies the AC power as UPS output power.

The server 2 is a computer that performs information processing and receives power supplied from the UPS device 1. The server 2 includes a power supply unit 3 and a baseboard 4. The power supply unit 3 is a power supply device that receives power supplied from the UPS device 1 and supplies DC voltage to the baseboard 4. The baseboard 4 is a board on which electronic components used for information processing, such as a central processing unit (CPU) and a random access memory (RAM), are mounted.

An operating system (OS) 5 is executed by the CPU, and UPS management software 6 runs as one application under management of the OS 5. The UPS management software 6 is software that manages the UPS device 1 and communicates with the NMC 20 by using the LAN. For example, after an IP address is set for the NMC 20, the UPS management software 6 performs setting of the UPS device 1 via the LAN.

Figure 3:
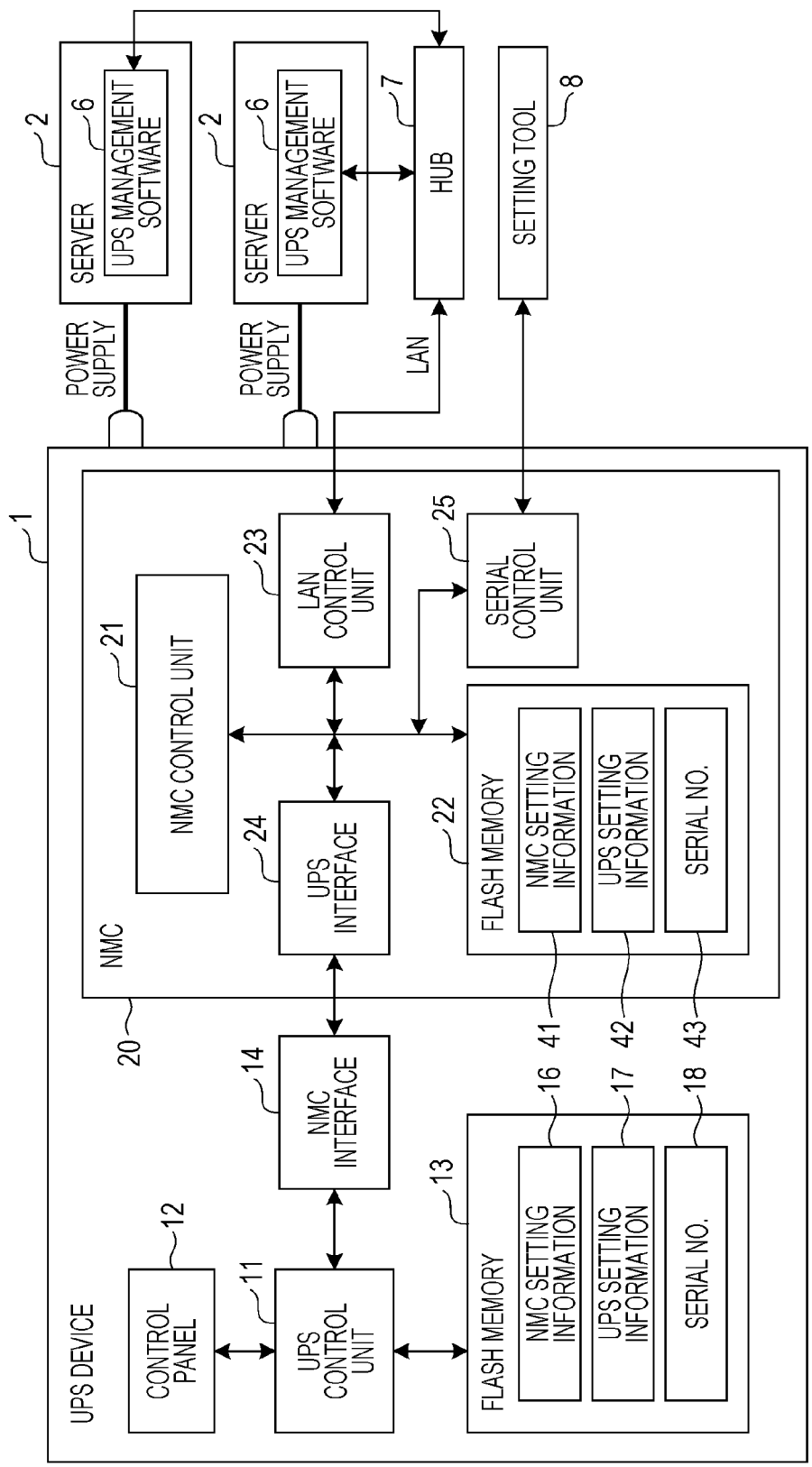
FIG. 3 is a diagram illustrating an example of a configuration of an NMC and a UPS main unit related to the NMC, according to an embodiment.

Next, the configuration of the NMC 20 and the configuration of the UPS main unit related to the NMC 20 will be described. FIG. 3 is a diagram illustrating a configuration of the NMC 20 and a configuration of the UPS main unit related to the NMC 20. As illustrated in FIG. 3, the NMC 20 includes an NMC control unit 21, a flash memory 22, a LAN control unit 23, a UPS interface 24, and a serial control unit 25. The UPS main unit includes the UPS control unit 11, a control panel 12, a flash memory 13, and an NMC interface 14.

The NMC control unit 21 controls the NMC 20. The NMC control unit 21 performs control so that setting information is stored both in the flash memory 22 included in the NMC 20 and the flash memory 13 included in the UPS main unit. The NMC control unit 21 will be described in more detail below.

The flash memory 22 is a nonvolatile memory in which the NMC setting information 41, the UPS setting information 42, and the serial No. 43 are stored. FIG. 4 is a diagram depicting an example of the NMC setting information 41. As depicted in FIG. 4, the NMC setting information 41 includes, as setting items, IP address, subnet mask, gateway, simple mail transfer protocol (SMTP) server name, outgoing e-mail address, and incoming e-mail address.

The IP address is an address identifying the NMC 20 in communication in the IP layer and is, for example, 192.168.1.100. The subnet mask is a value for breaking down an IP address into a network portion (the address of a network) and a host portion (the address of an individual device). For example, in the case where 24 bits are assigned to the network portion and 8 bits are assigned to the host portion, the value of the subnet mask is 255.255.255.0. The gateway is the IP address of a device coupled to an external network and is, for example, 192.168.1.1.

The SMTP server name is the name of a server for sending e-mail messages and is, for example, Mail.example.com. The outgoing e-mail address is the address of the source of an e-mail and is, for example, From_address@example.com. The incoming e-mail address is the address of the destination of an e-mail and is, for example, To_address@example.com. The SMTP server name, outgoing e-mail address, and incoming e-mail address are used, for example, in cases where, if an abnormality has occurred in the UPS device 1, an e-mail message is sent.

FIG. 5 is a diagram depicting an example of the UPS setting information 42. As depicted in FIG. 5, the UPS setting information 42 includes, as setting items, outlet group #1 shutdown time, outlet group #2 shutdown time, switching sensitivity, and low battery signal time. The UPS setting information 42 also includes outlet group #1 power-on delay time and outlet group #2 power-on delay time.

The outlet groups, in which outlets for supplying electricity from the UPS device 1 are grouped, include an outlet group #1 and an outlet group #2 here. The outlet group #1 shutdown time is a time taken until power supply from the outlet group #1 stops in the event of a power failure, and is, for example, 180 seconds. The outlet group #2 shutdown time is a time taken until power supply from the outlet group #2 stops in the event of a power failure, and is, for example, 120 seconds.

The switching sensitivity is sensitivity at which power supply is switched to the power supply from the battery 40 during a power failure. For example, when the switching sensitivity is "High", a time taken for switching is short. The low battery signal time is a time used for issuing an alarm for the remaining amount of the battery 40. For example, low battery signal time "7 min" indicates that an alarm will be output once the remaining time for power output of the battery 40 reaches seven minutes.

The outlet group #1 power-on ready time is a time taken until power supply from the outlet group #1 starts when the power of the UPS device 1 is restored. For example, the outlet group #1 power-on ready time is 10 seconds. The outlet group #2 power-on ready time is a time taken until power supply from the outlet group #2 starts when the power of the UPS device 1 is restored. For example, the outlet group #2 power-on ready time is 20 seconds.

Referring back to FIG. 3, the LAN control unit 23 controls communication using the LAN. Note that, in FIG. 3, the LAN is coupled via a hub 7 to the two servers 2. The UPS interface 24 is an interface for communication with the UPS main unit. The serial control unit 25 controls serial communication with a setting tool 8 with which setting of the NMC 20 is performed.

The control panel 12 of the UPS main unit is a panel for displaying the state of the UPS device 1 and accepting operations of the user. For example, the control panel 12 displays information on setting of the NMC 20 and the UPS device 1. The flash memory 13 is a nonvolatile memory in which the NMC setting information 16, the UPS setting information 17, and the serial No. 18 are stored. The NMC interface 14 is an interface for performing communication with the NMC 20.

Figure 6:
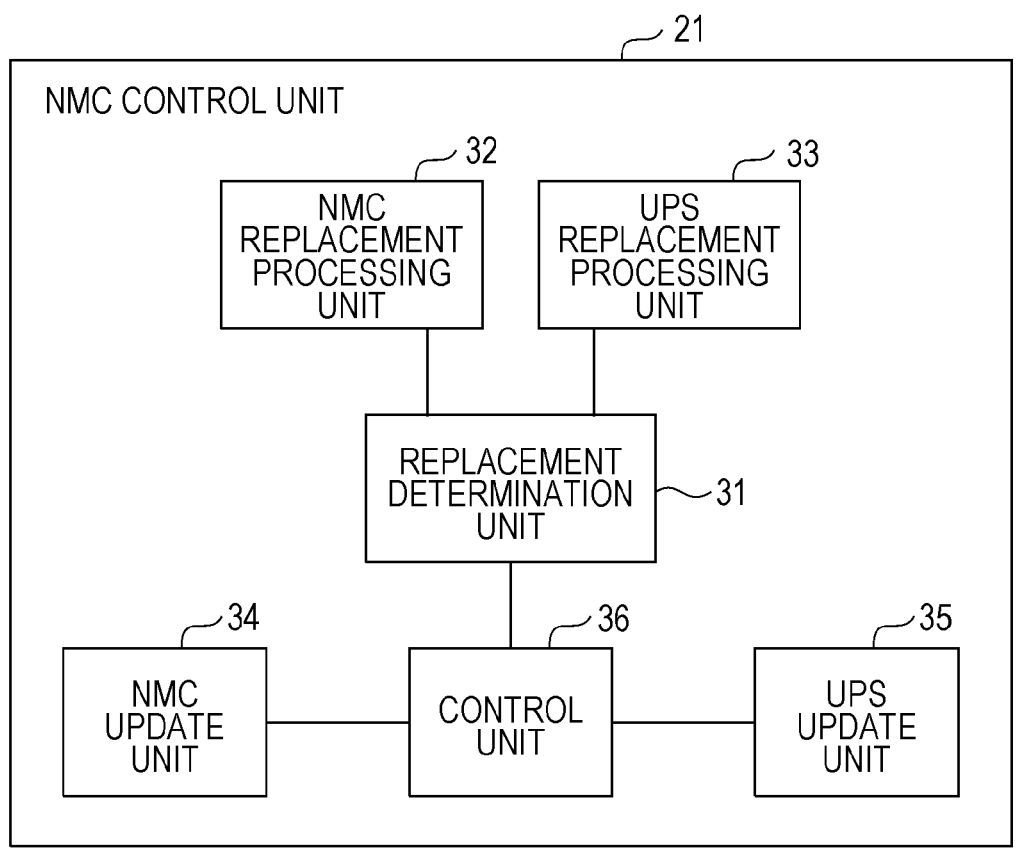
FIG. 6 is a diagram illustrating an example of a configuration of an NMC control unit, according to an embodiment.

Next, the configuration of the NMC control unit 21 will be described. FIG. 6 is a diagram illustrating a configuration of the NMC control unit 21. As illustrated in FIG. 6, the NMC control unit 21 includes a replacement determination unit 31, an NMC replacement processing unit 32, a UPS replacement processing unit 33, an NMC update unit 34, a UPS update unit 35, and a control unit 36.

The replacement determination unit 31 determines whether the NMC 20 or the UPS main unit has been replaced, based on the serial Nos. 43 and 18 and IP addresses included in the NMC setting information 41 and 16. Specifically, when the serial No. 43 is the default value, that is, zero, the replacement determination unit 31 determines that the NMC 20 has been replaced. When the serial No. 43 and the serial No. 18 do not match, the replacement determination unit 31 determines that the UPS main unit has been replaced.

When the IP addresses included in the NMC setting information 41 are the default values, that is, all zeros, the replacement determination unit 31 determines that the NMC 20 has been replaced. When the IP addresses included in the NMC setting information 41 and the IP addresses included in the NMC setting information 16 do not match, the replacement determination unit 31 determines that the UPS main unit has been replaced.

When it is determined by the replacement determination 31 that the NMC 20 has been replaced, the NMC replacement processing unit 32 restores setting information of the NMC 20 by copying setting information stored in the UPS main unit to the NMC 20. Specifically, the NMC replacement processing unit 32 copies the serial No. 18, the NMC setting information 16, and the UPS setting information 17 of the UPS main unit and sets the copies as the serial No. 43, the NMC setting information 41, and the UPS setting information 42 of the NMC 20, respectively.

When it is determined by the replacement determination 31 that the UPS main body has been replaced, the UPS replacement processing unit 33 restores setting information of the UPS main unit by copying setting information stored in the NMC 20 to the UPS main unit. Specifically, the UPS replacement processing unit 33 copies the NMC setting information 41 and the UPS setting information 42 of the NMC 20 and sets the copies as the NMC setting information 16 and the UPS setting information 17 of the UPS main unit, respectively. The UPS replacement processing unit 33 copies the serial No. 18 of the UPS main unit and stores the copy as the serial No. 43 in the NMC 20.

The NMC update unit 34 updates the NMC setting information 16 and 41. The UPS update unit 35 updates the UPS setting information 17 and 42. The control unit 36 is a processing unit that controls the entirety of the NMC control unit 21 and, in particular, moves control and delivers data between functional units.

Figure 7A:
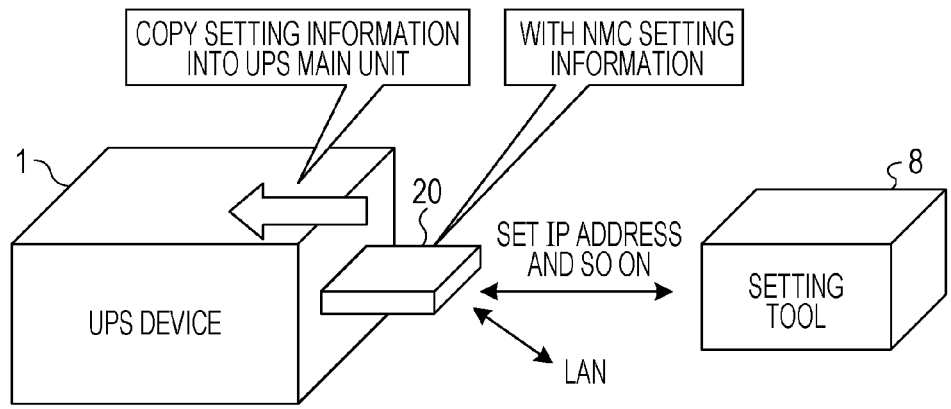
FIGS. 7A to 7D are diagrams illustrating a procedure for restoring setting information, according to an embodiment.

Next, a procedure for restoring setting information will be described. FIG. 7A to FIG. 7D are diagrams for explaining a procedure for restoring setting information. As illustrated in FIG. 7A to FIG. 7D, once the user sets the NMC setting information 41, such as an IP address, for the NMC 20 by using the setting tool 8, the NMC 20 copies the NMC setting information 41 and sets the copy as the NMC setting information 16 (FIG. 7A). Once the user sets the UPS setting information 17 via the LAN, the NMC 20 copies the serial No. 18 and the UPS setting information 17 into the NMC 20 and sets the copies as the serial No. 43 and the UPS setting information 42, respectively.

Figure 7B:
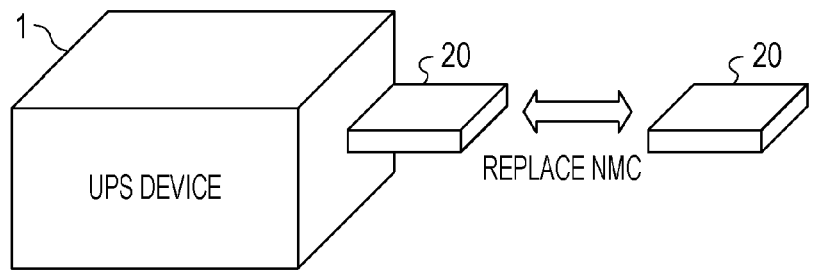
Figure 7C:
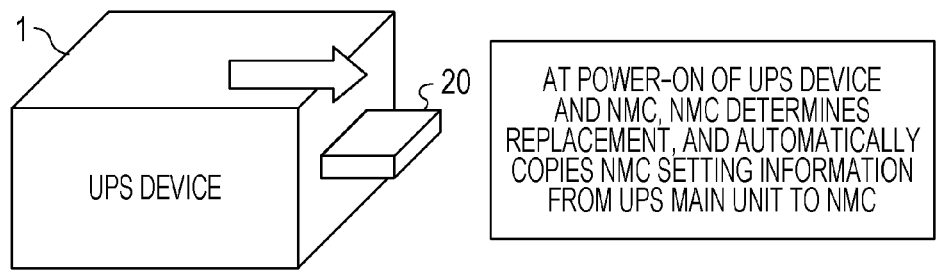

Subsequently, NMC replacement is performed (FIG. 7B). Then, at the time of power-on of the UPS device 1 and the NMC 20, the NMC 20 determines replacement and automatically copies the NMC setting information 16 from the UPS main unit to restore the NMC setting information 41 (FIG. 7C). The NMC 20 copies the serial No. 18 and the UPS setting information 17 into the NMC 20 and sets the copies as the serial No. 43 and the UPS setting information 42, respectively.

Figure 7D:
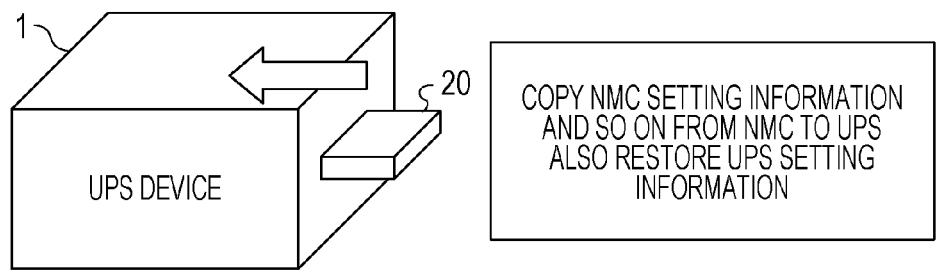

Once the UPS main unit is replaced, the NMC 20 copies the NMC setting information 41 from the NMC 20 into the UPS main unit and sets the copy as the NMC setting information 16, and copies the UPS setting information 42 from the NMC 20 into the UPS main unit to restore the UPS setting information 17 (FIG. 7D). The NMC 20 copies the serial No. 18 of the UPS main unit and sets the copy as the serial No. 43 of the NMC 20.

In such a way, the NMC 20 automatically restores setting information, and thereby may reduce the working hours required for maintenance and replacement of a device.

Figure 8:
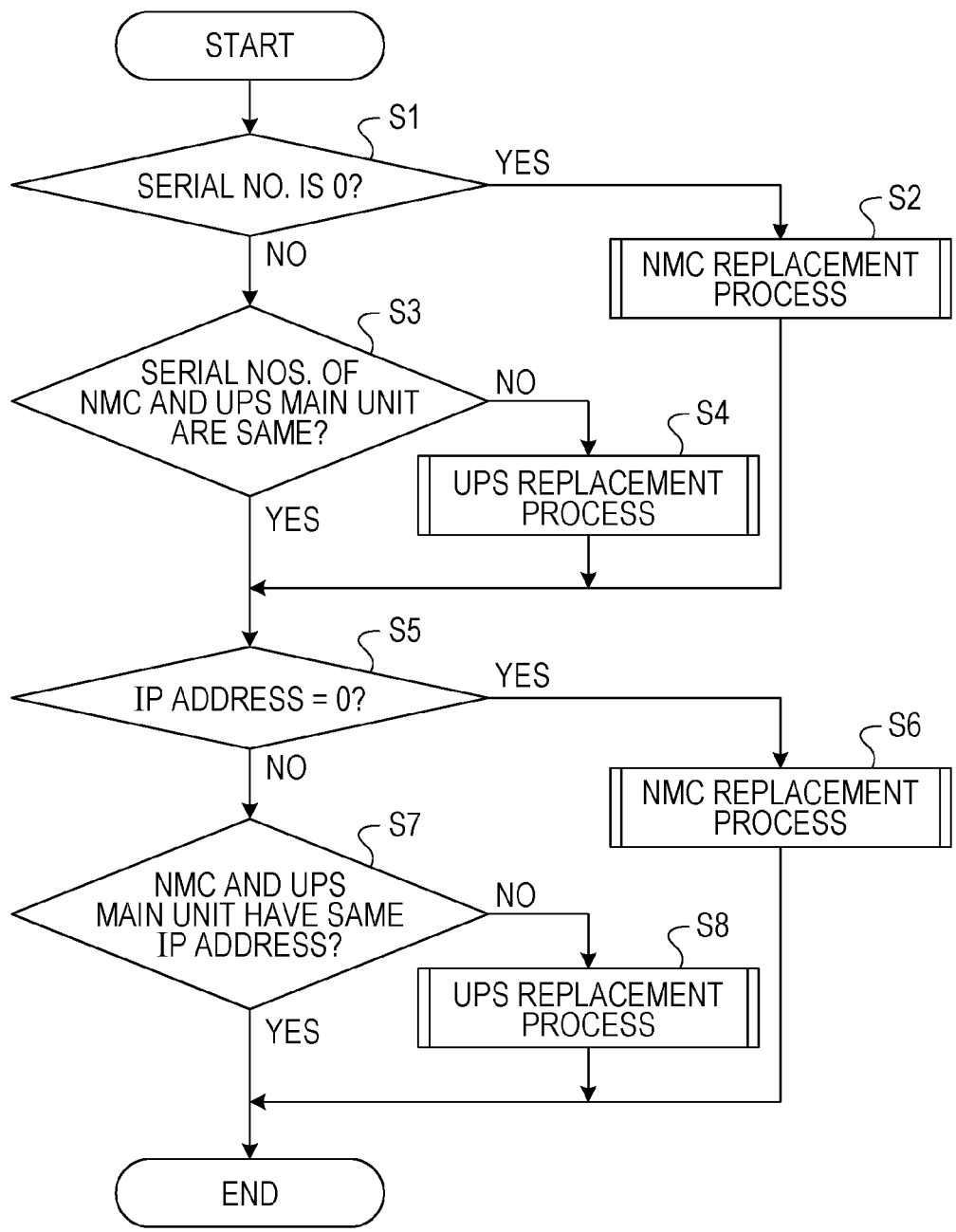
FIG. 8 is a diagram illustrating an example of an operational flowchart for a replacement process performed by an NMC, according to an embodiment.

Next, the flow of a replacement process performed by the NMC 20 will be described. FIG. 8 is an operational flowchart illustrating a flow of a replacement process performed by the NMC 20. As illustrated in FIG. 8, the NMC 20 determines whether the serial No. 43 is zero (step S1).

As a result, when the serial No. 43 is zero, the NMC 20 determines that the NMC 20 has been replaced, performs an NMC replacement process, which is a process at the time of NMC replacement (step S2), and proceeds to step S5. On the other hand, when the serial No. 43 is not zero, the NMC 20 determines whether the serial Nos. 43 and 18 of the NMC 20 and the UPS main unit are the same (step S3). As a result, when the serial Nos. 43 and 18 are not the same, the NMC 20 determines that the UPS main unit has been replaced, and performs a UPS replacement process, which is a process at the time of UPS main unit replacement (step S4).

The NMC 20 then determines whether the IP address of the NMC setting information 41 is zero (step S5). As a result, when the IP address is zero, the NMC 20 determines that the NMC 20 has been replaced, and performs the NMC replacement process (step S6). On the other hand, when the IP address is not zero, the NMC 20 determines whether the IP addresses of the NMC 20 and the UPS main unit are the same (step S7). As a result, when the IP addresses of the NMC 20 and the UPS main unit are not the same, the NMC 20 determines that the UPS main unit has been replaced, and performs the UPS replacement process (step S8).

In such a way, the NMC 20 determines whether a device has been replaced, by using the serial numbers and the IP addresses, and thus may restore setting information when the device has been replaced.

Next, the flow of the NMC replacement process will be described. FIG. 9 is an operational flowchart illustrating a flow of the NMC replacement process. As illustrated in FIG. 9, the NMC replacement processing unit 32 copies the serial No. 18 of the UPS main unit into the NMC 20 (step S11) and stores the copy as the serial No. 43.

The NMC replacement processing unit 32 then copies the NMC setting information 16 of the UPS main unit into the NMC 20 (step S12) to restore the NMC setting information 41. Then, the NMC replacement processing unit 32 copies the UPS setting information 17 of the UPS main unit into the NMC 20 (step S13) and stores the copy as the UPS setting information 42.

In such a way, when the NMC 20 has been replaced, the NMC 20 restores the NMC setting information 41 from the NMC setting information 16 stored in the UPS main unit, and thereby may reduce working hours required for maintenance and replacement of the NMC 20.

Next, the flow of the UPS replacement process will be described. FIG. 10 is an operational flowchart illustrating a flow of the UPS replacement process. As illustrated in FIG. 10, the UPS replacement processing unit 33 copies the serial No. 18 of the UPS main unit into the NMC 20 (step S21) and stores the copy as the serial No. 43.

The UPS replacement processing unit 33 then copies the NMC setting information 41 of the NMC 20 into the UPS main unit (step S22) and stores the copy as the NMC setting information 16. Then, the UPS replacement processing unit 33 copies the UPS setting information 42 of the NMC 20 into the UPS main unit (step S23) to restore the UPS setting information 17.

In such a way, when the UPS main unit has been replaced, the NMC 20 restores the UPS setting information 17 from the UPS setting information 42 stored in the NMC 20, and thereby may reduce working hours required for maintenance and replacement of the UPS main unit.

Figure 11:
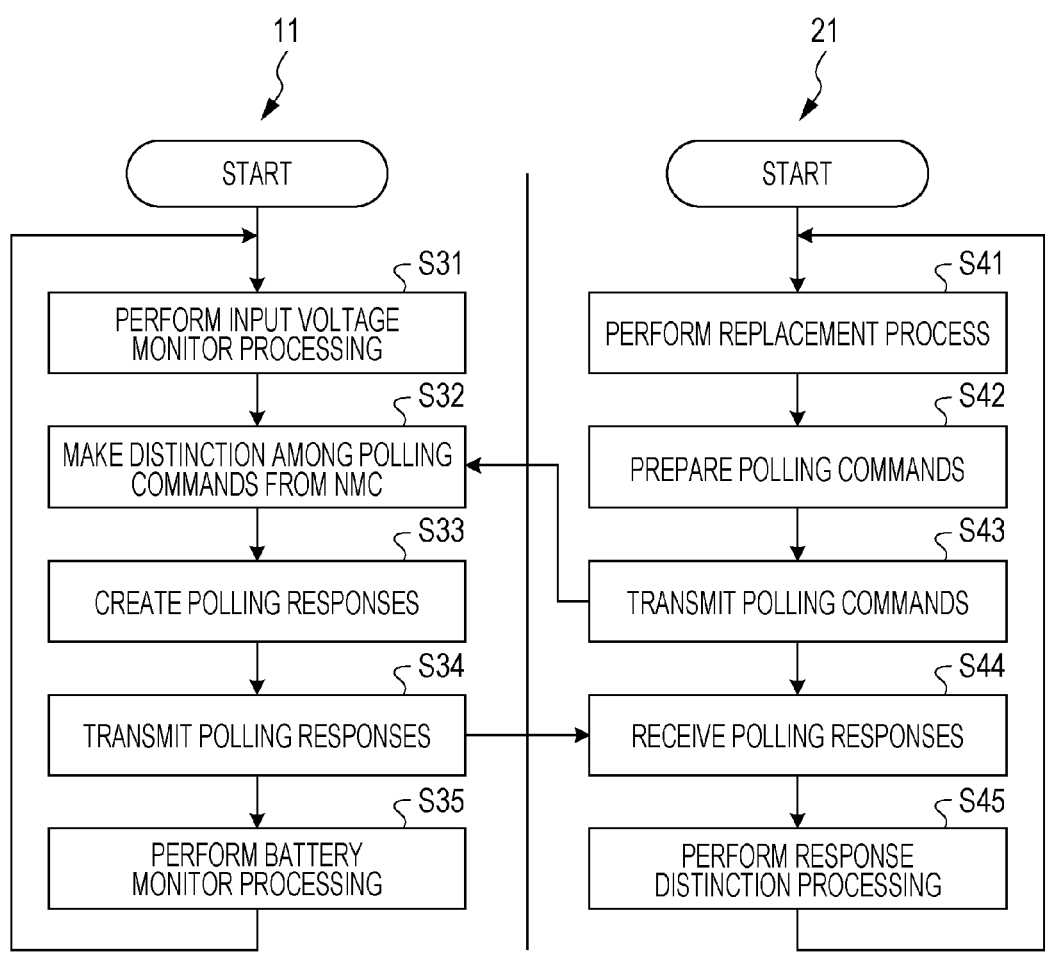
FIG. 11 is a diagram illustrating an example of an operational flowchart for main processes of a UPS control unit and an NMC control unit, according to an embodiment.

Next, the flows of main processes of the UPS control unit 11 and the NMC control unit 21 will be described. FIG. 11 is an operational flowchart illustrating flows of main processes of the UPS control unit 11 and the NMC control unit 21. The NMC control unit 21 monitors the state of the UPS device 1 in the main process by using a polling method.

As illustrated in FIG. 11, the UPS control unit 11 performs input voltage monitor processing of monitoring input voltage to the UPS device 1 (step S31). In contrast, the NMC control unit 21 performs the replacement process illustrated in FIG. 8 (step S41).

The NMC control unit 21 then prepares polling commands to be transmitted to the UPS control unit 11 (step S42) and transmits polling commands that have been completely prepared to the UPS control unit 11 (step S43). Here, examples of the polling commands include a read command and a write command for setting information.

The UPS control unit 11 makes distinctions among polling commands from the NMC 20 (step S32) and creates polling responses in accordance with the polling commands (step S33). Then, the UPS control unit 11 transmits the polling responses to the NMC 20 (step S34). Subsequently, the UPS control unit 11 performs battery monitor processing of monitoring the battery 40 (step S35) and returns to step S31.

The NMC control unit 21 receives the polling responses from the UPS main unit (step S44), performs response distinction processing in which distinctions among the contents of polling responses are made (step S45), and returns to step S41.

In such a way, the NMC control unit 21 may instruct the UPS control unit 11, for example, to read setting information and to update setting information by transmitting polling commands to the UPS control unit 11.

Figure 12:
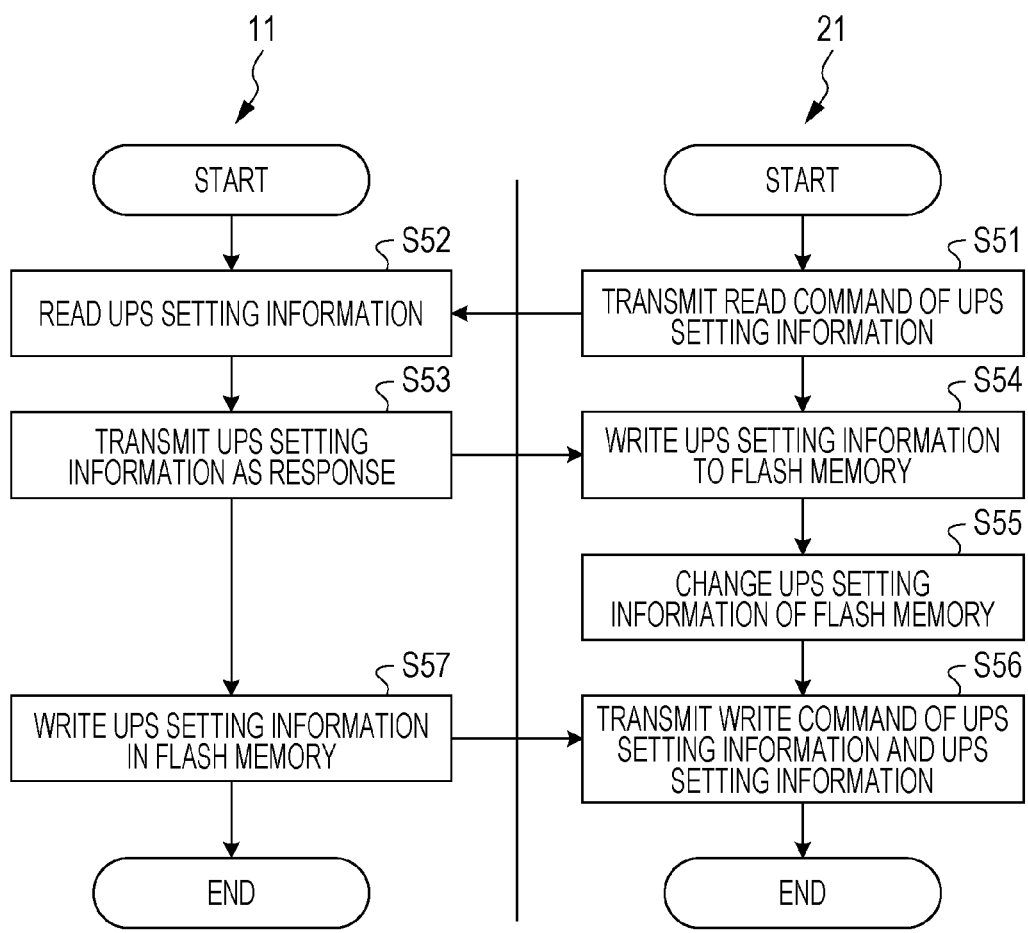
FIG. 12 is a diagram illustrating an example of an operational flowchart for a command sequence when updating UPS setting information from an NMC, according to an embodiment.

Next, a command sequence in the case of updating the UPS setting information 17 by the NMC 20 will be described. FIG. 12 is a diagram illustrating a command sequence in the case of updating the UPS setting information 17 from the NMC 20.

As illustrated in FIG. 12, the UPS update unit 35 sends a command for reading UPS setting information to the UPS control unit 11 (step S51). Then, the UPS control unit 11 reads the UPS setting information (step S52) and sends the UPS setting information 17 as a response (step S53).

The UPS update unit 35 then writes the UPS setting information 17 as the UPS setting information 42 to the flash memory 22 (step S54). Then, the UPS update unit 35 changes the UPS setting information 42 of the flash memory 22 (step S55) and sends a command for writing UPS setting information and the UPS setting information 42 to the UPS control unit 11 (step S56).

The UPS update unit 35 then writes the UPS setting information 42 as the UPS setting information 17 in the flash memory 13 (step S57).

In such a way, the UPS update unit 35 reads and changes the UPS setting information 17 and sends the changed information to the UPS control unit 11. Thus, the UPS update unit 35 may update the UPS setting information 17.

Figure 13:
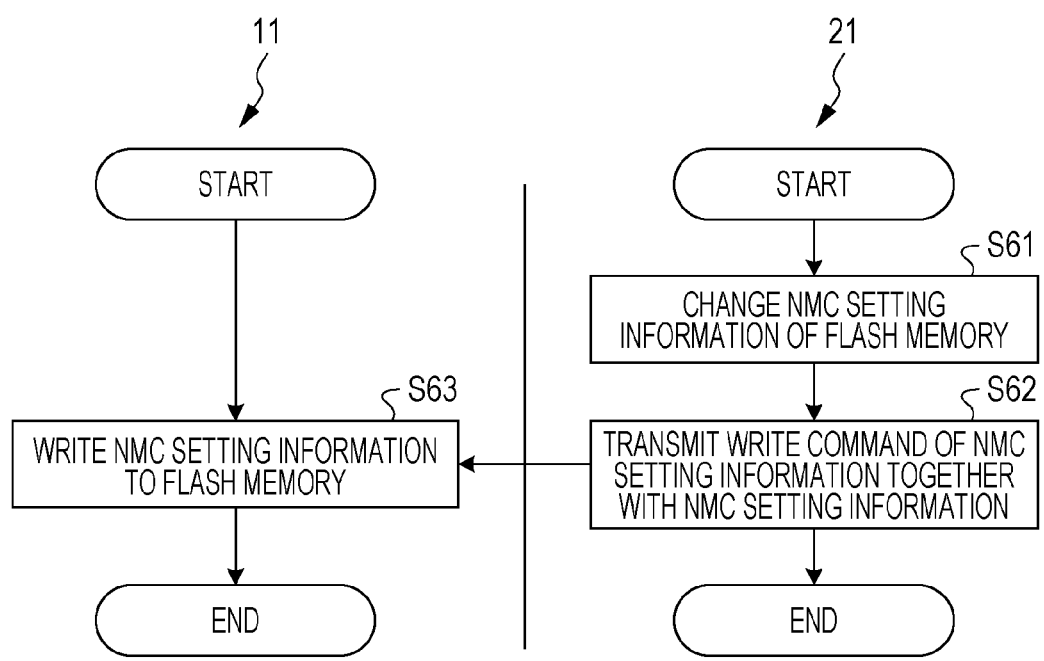
FIG. 13 is a diagram illustrating an example of an operational flowchart for a command sequence when updating NMC setting information, according to an embodiment.

Next, a command sequence in the case of updating the NMC setting information 41 will be described. FIG. 13 is a diagram illustrating a command sequence in the case of updating the NMC setting information 41. As illustrated in FIG. 13, the NMC update unit 34 of the NMC control unit 21 updates the NMC setting information 41 of the flash memory 22 (step S61).

The NMC update unit 34 then sends the command for writing the NMC setting information 41 together with the NMC setting information 41 to the UPS control unit 11 (step S62). Then, the UPS control unit 11 writes the NMC setting information 41 as the NMC setting information 16 in the flash memory 13 (step S63).

In such a way, the NMC update unit 34 sends the changed NMC setting information 41 to the UPS control unit 11 and thus may update the NMC setting information 16 stored in the UPS main unit.

Figure 14:
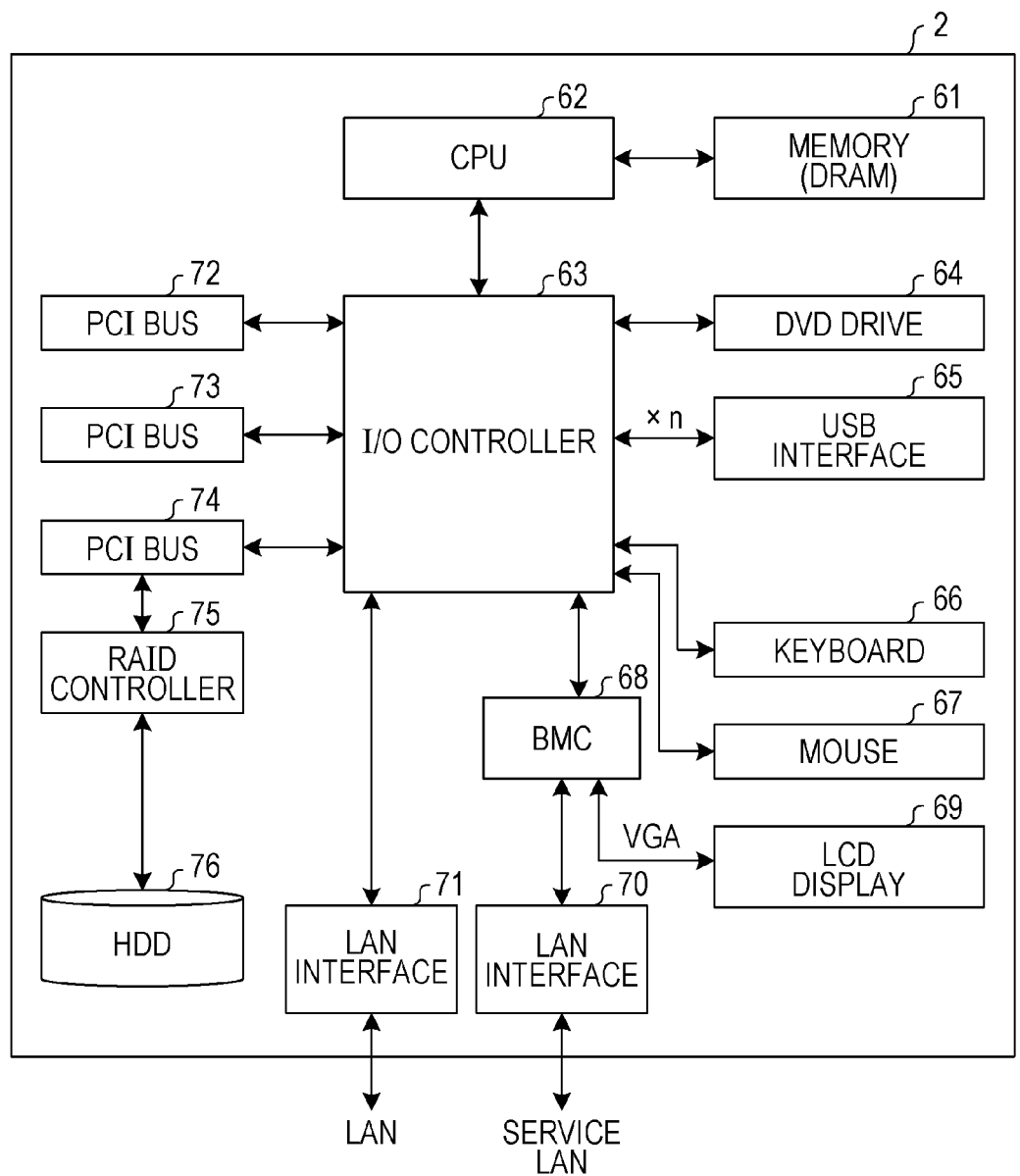
FIG. 14 is a diagram illustrating an example of a hardware configuration of a server, according to an embodiment.

Next, the hardware configuration of the server 2 will be described. FIG. 14 is a diagram illustrating a hardware configuration of the server 2. As illustrated in FIG. 14, the server 2 includes a memory 61, a CPU 62, an input/output (I/O) controller 63, a digital versatile disc (DVD) drive 64, n universal serial bus (USB) interfaces 65, a keyboard 66, a mouse 67, and a base management controller (BMC) 68. The server 2 further includes a liquid crystal display (LCD) display 69, LAN interfaces 70 and 71, peripheral component interface (PCI) buses 72 to 74, a redundant arrays of inexpensive disks (RAID) controller 75, and a hard disk drive (HDD) 76.

The memory 61 is a dynamic random access memory (DRAM) that stores programs and intermediate execution results of programs. The CPU 62 is a processing unit that reads and executes programs such as the UPS management software 6 from the memory 61. The I/O controller 63 is a control device for coupling an input-output device and peripheral devices to the CPU 62.

The DVD drive 64 is a device that performs reading and writing of a DVD. The USB interface 65 is an interface for coupling a USB device. The keyboard 66 is an input device for inputting characters and the like. The mouse 67 is a pointing device used for performing display screen operations and issuing instructions to the server 2.

The BMC 68 is a controller that performs operations such as monitoring hardware. The LCD display 69 is a display device that displays screens output from programs. The LAN interfaces 70 and 71 are interfaces for coupling to the LAN. The LAN interface 70 couples the service LAN used for operations, such as monitoring of the server 2, with the BMC 68. The LAN 71 couples the LAN used for applications with the I/O controller 63.

The PCI buses 72 to 74 are buses for coupling PCI devices. The RAID controller 75 is a device that controls the HDD 76. The HDD 76 is a nonvolatile storage device used for, for example, storage of programs and data.

The UPS management software 6 that is executed on the server 2 is stored in a DVD, is read from the DVD, and is installed in the server 2 by the DVD drive 64. Alternatively, the UPS management software 6 is stored in a database of another computer coupled via the LAN interface 71, or the like, is read from the database or the like, and is installed in the server 2. Then, the installed UPS management software 6 is stored in the HDD 76, is read into the memory 61, and is executed by the CPU 62.

As described above, in the first embodiment, the NMC setting information 41 stored in the NMC 20 is copied and the copy is stored as the NMC setting information 16 in the UPS main unit. The UPS setting information 17 and the serial No. 18 stored in the UPS main unit are stored as the UPS setting information 42 and the serial No. 43 in the NMC 20, respectively.

The replacement determination unit 31 of the NMC control unit 21 determines whether the NMC 20 or the UPS main unit has been replaced. Then, when the NMC 20 is replaced, the NMC replacement processing unit 32 restores the NMC setting information 41 from the NMC setting information 16. When the UPS main unit is replaced, the UPS replacement processing unit 33 restores the UPS setting information 17 from the UPS setting information 42.

Accordingly, the UPS device 1 may automatically restore setting information both when the NMC 20 is replaced and when the UPS main unit is replaced. This may reduce working hours required for maintenance and replacement of the NMC 20 or the UPS main unit.

When updating the NMC setting information 41 stored in the NMC 20, the NMC update unit 34 also updates the NMC setting information 16 stored in the UPS main unit. Accordingly, when the NMC 20 is replaced, the UPS device 1 may correctly restore the NMC setting information 41. When updating the UPS setting information 17 stored in the UPS main unit, the UPS update unit 35 also updates the UPS setting information 42 stored in the NMC 20. Accordingly, when the UPS main unit is replaced, the UPS device 1 may correctly restore the UPS setting information 17.

Second Embodiment

In the above first embodiment, when the NMC 20 or the UPS main unit is replaced, the setting information is automatically restored without the user recognizing it. However, the user sometimes wants to grasp that setting information is restored. Therefore, in a second embodiment, the UPS device 1 with which the user may recognize restoration of setting information will be described.

Figure 15A:
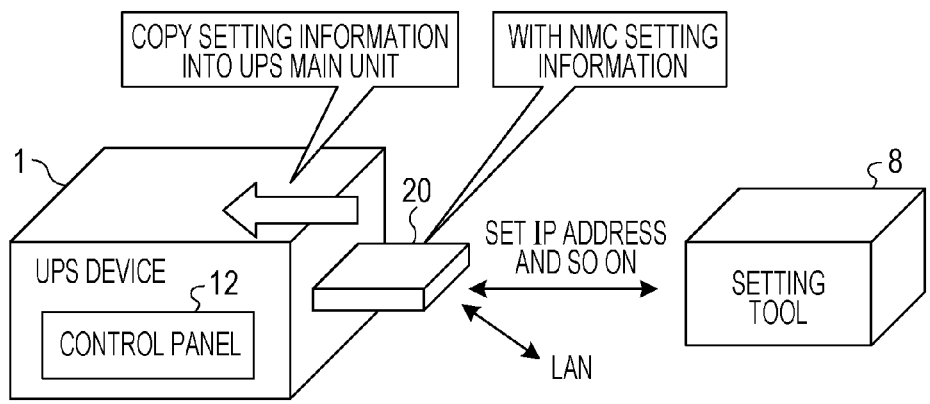
FIGS. 15A to 15D are diagrams illustrating a procedure of restoring setting information of a UPS device, according to an embodiment.
Figure 15B:
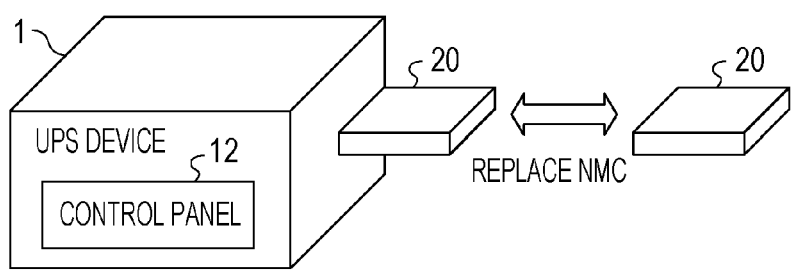
Figure 15C:
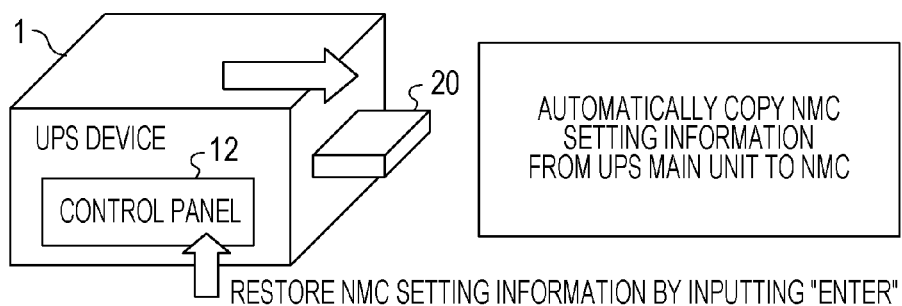
Figure 15D:
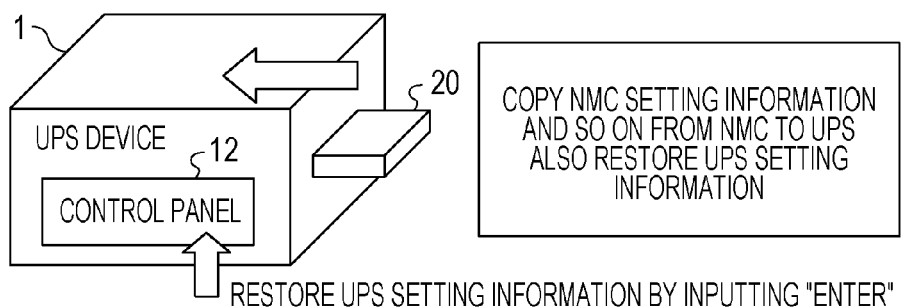

FIGS. 15A to 15D are diagrams for explaining a procedure of restoring setting information of the UPS device 1 according to the second embodiment. As illustrated in FIGS. 15A to 15D, once setting information is set (FIG. 15A) and an NMC is replaced (FIG. 15B), manual restoration is performed instead of automatic restoration (FIG. 15C). In manual restoration, a confirming message regarding setting of the NMC 20 is displayed on the display panel 20. Once the user inputs "ENTER", the NMC setting information 41 is restored. When the UPS main unit is replaced (FIG. 15D), a confirming message regarding setting of the UPS main unit is displayed on the control panel 12. Once the user inputs "ENTER", the UPS setting information 17 is restored.

In such a way, the NMC 20, when restoring setting information, asks the user for confirmation, and thus the user may recognize that setting information is restored.

Figure 16:
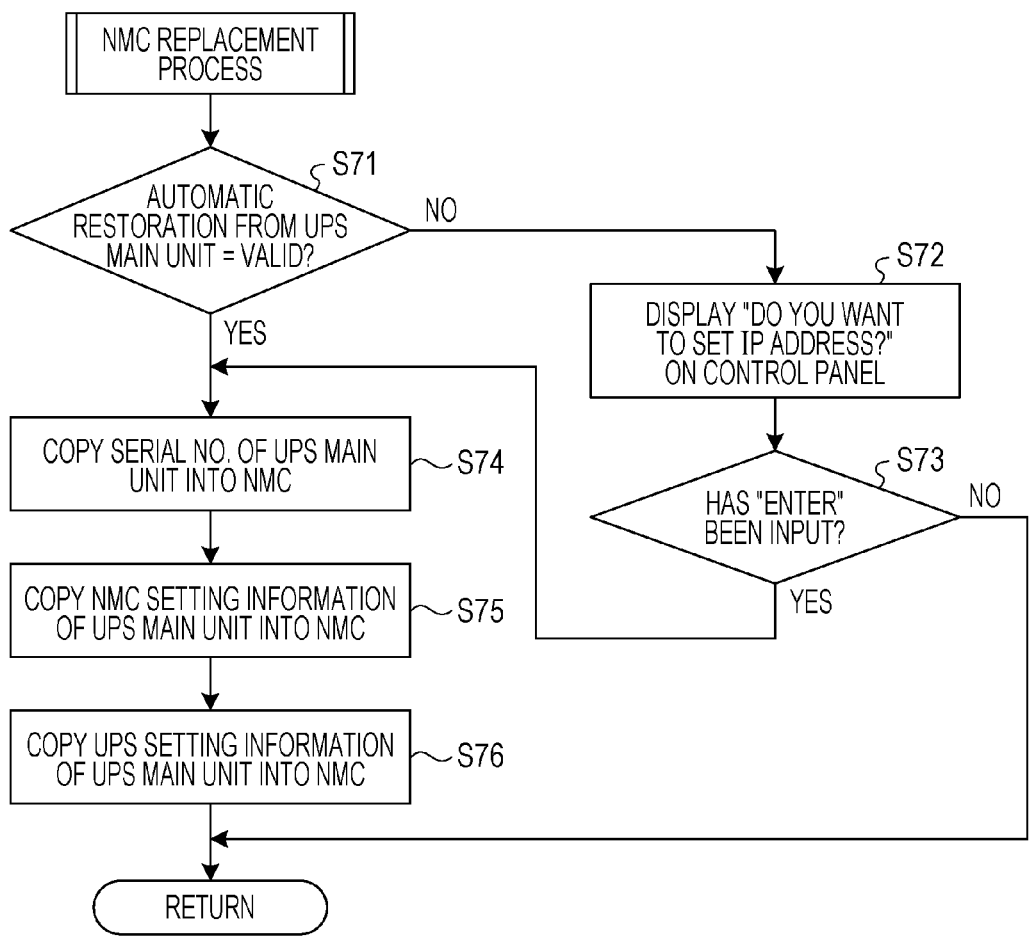
FIG. 16 is a diagram illustrating an example of an operational flowchart for an NMC replacement process, according to an embodiment.

FIG. 16 is an operational flowchart illustrating a flow of an NMC replacement process according to the second embodiment. As illustrated in FIG. 16, the NMC replacement processing unit 32 determines whether automatic restoration from the UPS main unit is valid (step S71) and, when automatic restoration is not valid, displays on the control panel 12 a confirming message "Do you want to set the IP address?" (step S72). Then, the NMC replacement processing unit 32 determines whether "ENTER" has been input (step S73) and, when "ENTER" has not been input, ends the process without performing restoration of the NMC setting information 41 and so forth.

On the other hand, when "ENTER" has been input, or when automatic restoration is valid, the NMC replacement processing unit 32 copies the serial No. 18 of the UPS main unit into the NMC 20 (step S74) and stores the copy as the serial No. 43.

The NMC replacement processing unit 32 then copies the NMC setting information 16 of the UPS main unit into the NMC 20 (step S75) to restore the NMC setting information 41. Then, the NMC replacement processing unit 32 copies the UPS setting information 17 of the UPS main unit into the NMC 20 (step S76) and stores the copy as the UPS setting information 42.

In such a way, the NMC replacement processing unit 32, when restoring the NMC setting information 41, asks the user for confirmation, and thus the user may recognize that the NMC setting information 41 is restored.

Figure 17:
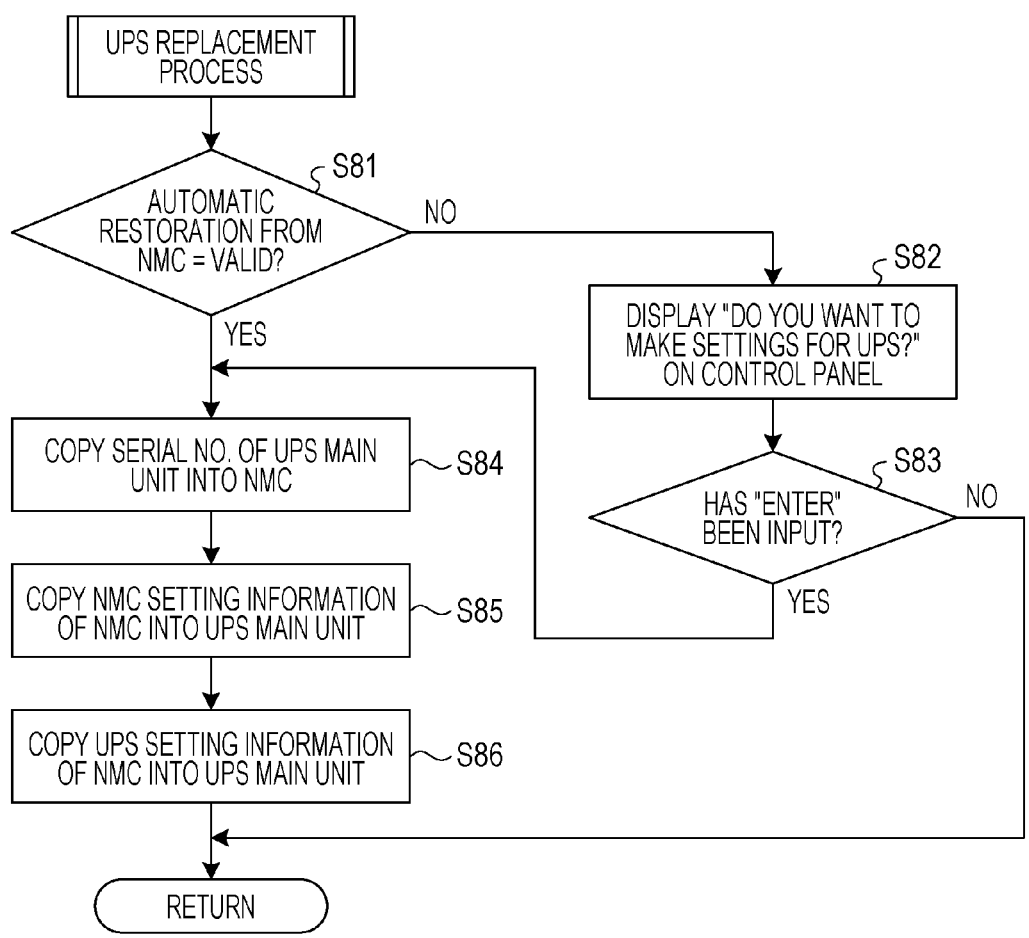
FIG. 17 is a diagram illustrating an example of an operational flowchart for a UPS replacement process, according to an embodiment.

FIG. 17 is an operational flowchart illustrating a flow of a UPS replacement process according to the second embodiment. As illustrated in FIG. 17, the UPS replacement processing unit 33 of the NMC control unit 21 determines whether automatic restoration from the NMC 20 is valid (step S81) and, when automatic restoration is not valid, displays on the control panel 12 a confirmation message "Do you want to make settings for UPS" (step S82). Then, the UPS replacement processing unit 33 determines whether "ENTER" has been input (step S83) and, when "ENTER" has not been input, ends the process without performing restoration of the UPS setting information 17 and so forth.

On the other hand, when "ENTER" has been input or automatic restoration is valid, the UPS replacement processing unit 33 copies the serial No. 18 of the UPS main unit into the NMC 20 (step S84) and stores the copy as the serial No. 43.

The UPS replacement processing unit 33 then copies the NMC setting information 41 of the NMC 20 into the UPS main unit (step S85) and stores the copy as the NMC setting information 16. Then, the UPS replacement processing unit 33 copies the UPS setting information 42 of the NMC 20 into the UPS main body (step S86) to restore the UPS setting information 17.

In such a way, the UPS replacement processing unit 33, when restoring the UPS setting information 17, asks the user for confirmation, and thus the user may recognize that the UPS setting information 17 is restored.

FIG. 18 is a diagram illustrating an operation example of the control panel 12. As illustrated in FIG. 18, the control panel 12 includes an on-line light emitting diode (LED) 51, a UPS output on/off button 52, an on-battery LED 53, a failure LED 54, a battery replacement LED 55, a display screen 56, scroll buttons 57, an ENTER button 58, and an ESC button 59.

The on-line LED 51 is an LED indicating whether the power of the UPS device 1 is turned on. The UPS output on/off button 52 is a button for turning on and off output of the UPS device 1. The on-battery LED 53 is an LED indicating whether the battery is discharging. The failure LED 54 is an LED indicating whether the UPS device 1 is under failure conditions. The battery replacement LED 55 is an LED indicating whether the battery has to be replaced.

The display screen 56 is a screen on which messages such as a confirmation message for automatic restoration of setting information are displayed. The scroll buttons 57 are buttons for scrolling the display screen 56. The ENTER button 58 is a button for inputting "ENTER". The ESC button 59 is a button for displaying a menu on the display screen 56.

The procedure in the case of restoring the NMC setting information 41 is 1) to power on the UPS device 1 and the NMC 20, 2) to confirm display of "Do you want to set the IP address?" on the display screen 56, and 3) to press the ENTER button 58. The procedure in the case of restoring the UPS setting information 17 is 1) to power on the UPS device 1 and the NMC 20, 2) to confirm display of "Do you want to make settings for UPS?" on the display screen 56, and 3) to press the ENTER button 58.

As described above, in the second embodiment, the NMC replacement processing unit 32 and the UPS replacement processing unit 33, when restoring setting information, ask the user for confirmation. Thus, the user may recognize that setting information is restored.

Although the NMC control unit 21 has been described in the first and second embodiments, the NMC control unit 21 may be implemented by executing NMC control firmware on a microcomputer. Accordingly, the configuration of hardware with which the NMC control unit 21 is implemented will be described.

Figure 19:
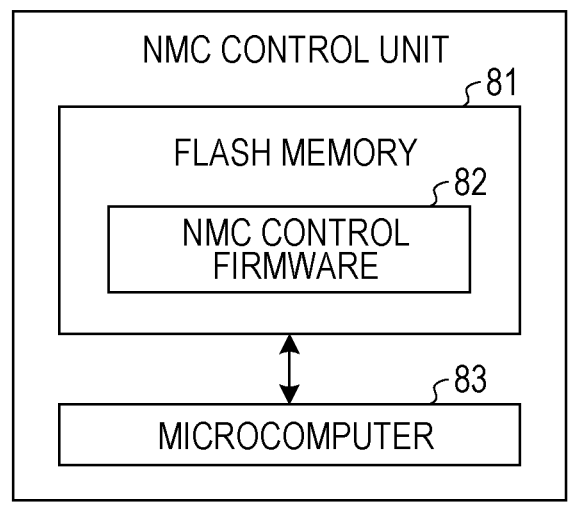
FIG. 19 is a diagram illustrating an example of a configuration of hardware with which an NMC control unit is implemented, according to an embodiment.

FIG. 19 is a diagram illustrating a configuration of hardware with which the NMC control unit 21 is implemented. As illustrated in FIG. 19, the NMC control unit 21 is implemented by executing NMC control firmware 82 stored in a flash memory 81 on a microcomputer 83. Note that the flash memory 81 may be the flash memory 22 illustrated in FIG. 3. That is, the NMC setting information 41 and the like and the NMC control firmware 82 may be stored in one flash memory.

Figure 20:
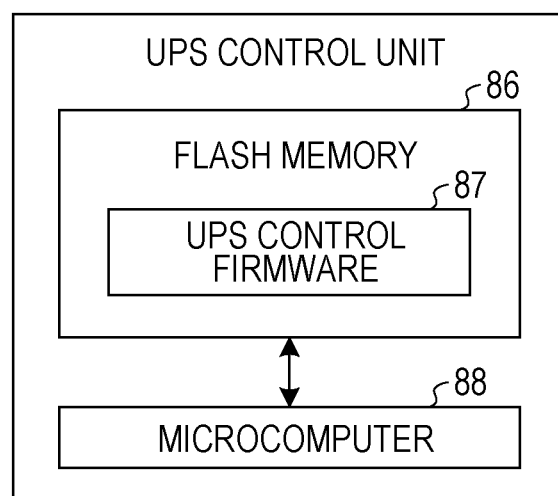
FIG. 20 is a diagram illustrating an example of a configuration of hardware with which a UPS control unit is implemented, according to an embodiment.

Similarly, the UPS control unit 11 is also implemented by executing UPS control firmware on a microcomputer. FIG. 20 is a diagram illustrating a configuration of hardware with which the UPS control unit 11 is implemented. As illustrated in FIG. 20, the UPS control unit 11 is implemented by executing UPS control firmware 87 stored in a flash memory 86 on a microcomputer 88. Note that the flash memory 86 may be the flash memory 13 illustrated in FIG. 3. That is, the UPS setting information 17 and the like and the UPS control firmware 87 may be stored in one flash memory.

Furthermore, although the case where the NMC 20 automatically restores setting information has been described in the first and second embodiments, the present disclosure is not limited to this and may be similarly applied to the case where the UPS control unit 11 of the UPS main unit automatically restores setting information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus installed in a main unit device and used for transmission, the main unit device including:
   a memory, of the main unit device, storing first setting information for configuring the main unit device and the apparatus, the apparatus comprising:

a memory, of the apparatus, configured to store second setting information for configuring the main unit device and for configuring the apparatus; and a processor coupled to the memory of the apparatus, the processor being configured:

to determine whether one of the main unit device and the apparatus replaced a previous main unit device or a previous apparatus, respectively, based on an IP address included in the second setting information stored in the memory of the apparatus, wherein the apparatus is installed in the previous main unit device and subsequently installed in the main unit device when the main unit device replaces the previous main unit device, to, when determining that the apparatus replaced a previous apparatus whose configuration is identical with that of the apparatus, copy the first setting information stored in the memory of the main unit device into the memory of the apparatus as the second setting information for the apparatus; and to, when determining that the main unit device replaced the previous main unit device whose configuration is identical with that of the main unit device, copy the second setting information stored in the memory of the apparatus into the memory of the main unit device as the first setting information.

2. The apparatus of claim 1, wherein the processor determines whether a user agrees to copying the first setting information or second setting information by displaying a message; and the processor executes copying of the first or second setting information when it is determined that the user has agreed to copying the first or second setting information.

3. The apparatus of claim 1, wherein the processor is further configured to cause any one of the main unit device and the apparatus to update the first setting information stored in the memory of the main unit device.

4. The apparatus of claim 1, wherein the processor is further configured to cause any one of the main unit device and the apparatus to update the second setting information stored in the memory of the apparatus.

5. A method performed by an apparatus, the apparatus being installed in a main unit device and used for transmission, the main unit device including:

a memory, of the main unit device, storing first setting information for configuring the main unit device and for configuring the apparatus, the apparatus comprising:

a memory, of the apparatus, storing second setting information for configuring the main unit device and for configuring the apparatus, the method comprising:

determining whether one of the main unit device and the apparatus replaced a previous main unit device or a previous apparatus, respectively, based on an IP address included in the second setting information stored in the memory of the apparatus, wherein the apparatus is installed in the previous main unit device and subsequently installed in the main unit device when the main unit device replaces the previous main unit device;

when determining that the apparatus replaced a previous apparatus whose configuration is identical with that of the apparatus, copying the first setting information stored in the memory of the main unit device into the memory of the apparatus as the second setting information for the apparatus; and when determining that the main unit device replaced the previous main unit device whose configuration is identical with that of the main unit device, copying the second setting information stored in the memory of the apparatus into the memory of the new main unit device as the first setting information.

* * * * *